United States Patent [19]

Miller et al.

[11] Patent Number: 4,626,566

[45] Date of Patent: Dec. 2, 1986

[54] COMPOSITION

[75] Inventors: Kenneth F. Miller; Omar M. Boutni, both of Mt. Vernon, Ind.

[73] Assignee: General Electric Company, Mt. Vernon, Ind.

[21] Appl. No.: 813,381

[22] Filed: Dec. 26, 1985

[51] Int. Cl.$^4$ .......................... C08K 5/01; C08L 69/00
[52] U.S. Cl. .................................. 524/490; 524/474; 524/537; 524/605; 524/611
[58] Field of Search ............... 524/490, 474, 611, 537, 524/605

[56] References Cited

U.S. PATENT DOCUMENTS

| | | | |
|---|---|---|---|
| 3,186,961 | 6/1965 | Sears | 524/611 |
| 4,146,524 | 3/1979 | Mitchell | 524/611 |
| 4,415,696 | 11/1983 | Mark | 524/490 |
| 4,446,268 | 5/1984 | Lee | 524/611 |
| 4,487,874 | 12/1984 | Lindner | 524/611 |

FOREIGN PATENT DOCUMENTS

| | | | |
|---|---|---|---|
| 49-64642 | 6/1974 | Japan | 524/490 |
| 54-16559 | 2/1979 | Japan | 524/611 |
| 57-94039 | 6/1982 | Japan | 524/611 |

*Primary Examiner*—C. Warren Ivy
*Attorney, Agent, or Firm*—Joseph T. Eisele; Martin B. Barancik

[57] ABSTRACT

A composition comprising an aromatic carbonate polymer in admixture with a mold release effective amount of a hydrogenated alpha-olefin oligomer fluid.

10 Claims, No Drawings

COMPOSITION

BACKGROUND OF THE INVENTION

Injection molding provides a convenient way for preparing various articles from thermoplastic resins, particularly objects of a relatively intricate nature. In order to injection mold articles in an economic manner, it is important to minimize the adhesion of the molded part to the mold surface through the use of a release agent. It is additionally advantageous that the release agent be incorporated in the material to be demolded. However, such an internal agent must be compatible with the resin, that is, it should not lead to any significant loss of the other physical properties such as transparency and melt stability as measured by the usual characteristics of the resin under normal conditions and heat treatments.

Of the thermoplastic resins which find a mold release agent useful from time to time are polycarbonate, copolyestercarbonate and blends of these resins with aliphatic polyester resins. As a result of the generally high temperature which these thermoplastics are subjected to during molding and the inherent sensitivity of these resins to chemical attack and degradation by additives which are often compatible with many other thermal plastics, it is necessary to select mold release agents with high temperature stability and compatibility with polycarbonates. Mineral oils are one types of mold release agents as described in K53,22556; K79,16559; K72,41093; K80,84353 and GB 2,077,742. Mineral oils are naturally occuring complex mixtures of paraffinic and naphthalenic hydrocarbons that are obtained from petroleum.

We have found that synthetic mineral oils derived from the oligomerization of alpha olefins followed by hydrogenation to remove unsaturation provide a surprising benefit over normal paraffins and conventional mineral oils as mold release agents in various polymers including polycarbonate, copolyestercarbonate and blends of polycarbonate with other resins including cycloaliphatic or aliphatic-cycloaliphatic polyester resins without introducing significant detrimental effects on color, stability and other properties associated with these resins.

DESCRIPTION OF THE INVENTION

In accordance with the invention, there is a composition comprising an aromatic carbonate polymer in admixture with a mold release effective amount of a hydrogenated alpha-olefin oligomer fluid. Although a wide range of alpha olefins and mixtures of olefins can be used to prepare hydrogenated alpha-olefin oligomeric fluids, the preferred alpha olefin is 1-decene.

The aromatic carbonate polymers are prepared by well known techniques available in the art, see for example U.S. Pat. No. 4,444,935, column 2, line 26 to column 3, line 61. The typical polycarbonates can be employed in the invention, for example, homopolycarbonates such as bisphenol-A polycarbonates and copolycarbonates wherein two or more dihydric phenols are employed. Further aromatic carbonate polymers include the copolyestercarbonates such as those disclosed in Goldberg U.S. Pat. No. 3,169,121 and Miller U.S. Pat. No. 4,465,820, both incorporated by reference.

The hydrogenated alpha-olefin oligomer fluids useful in this invention are derived from the oligomerization of 1-olefins through a catalytic reaction followed by hydrogenation to remove unsaturation. Examples of such catalysis include: cationic catalysis, see J. A. Breenan, Ind. Eng. Chem. Prod. Res. Div. (1980) 19, 2; Ziegler catalysis, see D. H. Antonsen et al, Ind. Eng. Chem. Prod. Res. Div. (1963), 2, 224; or metathesis catalysis, see W. T. Nelson et al, Ind. Eng. Chem. Prod. Res. Div., (1983), 22, 178 and references therein. Methods of preparation are also disclosed in U.S. Pat. No. 4,282,392; 4,225,739; 4,319,065; 4,311,864; 4,334,113 and 4,409,415 and references therein.

The product of oligomerization/hydrogenation is a mineral oil with fluidity over a wide temperature range. The product generally is a mixture of oligomers of various degrees of polymerization, branching and isomerization depending on the nature of the catalyst and olefin used and any subsequent product fractionation such as by distillation. A product structure representative of this type of oligomerization is 9-methyl-11-n-octyl heneicosane. Normal alpha olefins of 6-12 carbon atoms are preferred for the preparation of synthetic fluids, with 1-decene being most common. The oligomers are generally separated into various mixtures of dimer, trimer, tetramer and pentamer to achieve varying degrees of volatility, viscosity and viscosity index. The preferred saturated alpha-olefin oligomer fluids for this invention are those with a kinematic viscosity of approximately 2-8 cSt at 100° C. as determined by ASTM D445. For the purposes of this invention, the saturated alpha-olefin oligomer fluids can also be blended with other lubricants such as the synthetic and naturally occuring polyol esters.

An effective mold releasing amount of the material of the invention is employed in the thermoplastic composition. Any amount of material which reduces the amount of pressure needed to eject the article from the injection mold and obtain a substantially unblemished article in comparison to the pressure needed to eject the thermoplastic composition control is an effective mold releasing amount. In general, effective amounts of the material are from about 0.01 to about 1.0 weight percent, based on the quantity of thermoplastic resin present, preferably from about 0.05 to about 0.5 weight percent. The material can be added to the resin in the normal manner that the other additives are added and coextruded. Depending upon the volatility of the compound at common processing and extrusion temperatures, an excess may be initially employed in the composition.

Other common additives for thermoplastic resins may also be employed. For example with respect to aromatic polycarbonate, additives which are commonly known to stabilize the resin thermally such as a phosphite can be employed. Stabilizers such as epoxides may also be employed as well as agents which are flame retardants, drip inhibitors, ductility enhancers, antioxidants, solvent resistance enhancers, ultraviolet light stabilizers, colorants and various inert fillers. Impact modifiers may also be present in the composition.

Below are specific examples of the invention. The examples are intended to illustrate but not narrow the inventive concept. The saturated alpha-olefin oligomer fluids used in the following examples are those available from Emery Industries. These synthetic fluids are derived from 1-decene and are referred to as Emery 3002, Emery 3004 and Emery 3006. The approximate composition of these fluids, as determined by gas chromatography is shown below.

|  | DIMER | TRIMER | TETRA-MER | PEN-TAMER | AVG. # CARBONS |
|---|---|---|---|---|---|
| 3002 | 100% | — | — | — | 20 |
| 3004 | — | 89 | 11 | — | 31 |
| 3006 | — | 29 | 62 | 9 | 38 |

Alternatively, the Synfluids manufactured by Gulf Oil Corporation could also be used. All percentages of the additives are in weight percent of the thermoplastic resin.

In the ensuing examples the aromatic polycarbonate is LEXAN®140, a polymer produced by reacting bisphenol-A and phosgene and having an intrinsic viscosity at 25° C. in methylene chloride at 25° C. of 0.49–0.52 dl/grams. The copolyestercarbonate is prepared in accordance with the methods of U.S. Pat. No. 4,465,820 wherein bisphenol-A is the dihydric phenol and has 75 mole percent phthalate ester linkages of which 7 percent are terephthalate, the remainder isophthalate. Kodar®A150 is available from Eastman and is a polyester of trans 1,4-cyclohexane dimethanol and iso and terephthalic acid. The mold release agent was dry formulated into the resins at levels of 0.3 weight percent unless otherwise stated. Also present in the composition was 0.03 weight percent of a phosphite stabilizer.

Mold release effectiveness was determined in an injection molding machine with a 4 ounce shot capacity. The part molded was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied. The ejector pin pressure, measured in pounds per square inch, reflects the difficulty of ejecting the part under mold conditions.

The Yellowness Index (Y.I.) was measured in accordance with ASTM D1825 on 2"×3"×⅛" chips molded at 580° and 650° F. The magnitude of the yellowness index is an indication of the detrimental effect of an additive on the optical properties of polycarbonate. These measurements are also reported in the Tables.

The Kasha Index (KI) was measured to determine the effect of the release agents on the melt stability of the resin. The KI of a resin is a measurement of its melt viscosity and is obtained in the following manner: 7 grams of resin, dried a minimum of 90 minutes at 125° C., are added to a modified Tinius-Olsen model T3 melt indexer; the temperature in the indexer is maintained at 300° C. and the resin is heated at this temperature for 6 or 12 minutes, after 6 or 12 minutes the resin is forced through a 0.04125 inch radius orifice using a plunger of radius 0.1865 inch and an applied force of 17.7 lbs.; the time required for the plunger to travel two inches is measured in centiseconds; that is reported as the KI. For a given resin compounded with a series of different additives, the most melt stable additive (i.e. the additive which reduces the melt viscosity of the resin the least) will display the highest KI. Results are reported below in Tables 1, 2 and 3.

Other KODAR ® resins can be employed in combination with the polycarbonate, for example resin prepared from terephthalic acid or ester precursor and mixtures of trans-1,4-cyclohexane dimethanol and alkylene diols having from 2 to about 10 carbon atoms, preferably ethylene glycol and 1,4-butanediol. The trans-1,4-cyclohexane dimethanol is from about 20 to about 80 mole percent of the total diol in the polymer, the alkylene diol making up the remainder of the diol in the polymerization.

TABLE 1

| | BISPHENOL-A POLYCARBONATE RESIN | | | | |
|---|---|---|---|---|---|
| SAMPLE | MOLD RELEASE[1] ADDITIVE | EJECTOR PIN PRESSURE (PSI) | YELLOWNESS INDEX | % TRANS-MISSION | KI (6 MIN) |
| Control 1 | Pentaerythritol tetrastearate | 10,155 | — | — | — |
| Control 2 | Eicosane (C20)[2] | 3,610 | 2.1 | 89.2 | 3370 |
| Control 3 | Dotricontane (C32)[2] | 6,030 | 1.7 | 90.1 | 3450 |
| Control 4 | Tetra tetracontane (C44)[3] | 7,120 | 1.7 | 90.1 | 3620 |
| Control 5 | Aldrich Mineral Oil[2] | 6,250 | 1.6 | 90.2 | 3480 |
| Control 6 | Drakeol 35 Mineral Oil[4] | 9,280 | 1.7 | 90.1 | 3700 |
| Example 1 | Emery 3002[5] (C20) | 3,975 | 2.4 | 89.8 | 3280 |
| Example 2 | Emery 3004[5] (C31) | 4,983 | 1.8 | 90.0 | 3300 |
| Example 3 | Emery 3006[5] (C38) | 5,836 | 1.8 | 90.1 | 3280 |

[1]0.3 phr mold release additive
[2]Purchased from Aldrich Chemical, Milwaukee, Wisconsin
[3]Purchased from Alfa Products, Thiabol/Ventron Division, Danvers, MA.
[4]Penreco White Mineral Oil, Pennzoil, Butler, PA.
[5]Synthetic Mineral Oil, Emery Industries, Cincinnati, Ohio

TABLE 2

| | BISPHENOL-A COPOLYESTERCARBONATE RESIN | | | | |
|---|---|---|---|---|---|
| SAMPLE | MOLD RELEASE[1] ADDITIVE | EJECTOR PIN PRESSURE (PSI) | YELLOWNESS INDEX | % TRANS-MISSION | KI (6 MIN) |
| Control 7 | none | Would not release, parts broke | 5.0 | 89.0 | 38945 |
| Control 8 | Pentaerythritol tetrastearate | 9380 | 6.0 | 88.8 | 43930 |
| Example 4 | Emery 3002[5] (C20) | 6795 | 4.9 | 89.0 | 45285 |

TABLE 2-continued

BISPHENOL-A COPOLYESTERCARBONATE RESIN

| SAMPLE | MOLD RELEASE[1] ADDITIVE | EJECTOR PIN PRESSURE (PSI) | YELLOWNESS INDEX | % TRANSMISSION | KI (6 MIN) |
|---|---|---|---|---|---|
| Example 5 | Emery 3004[5] (C31) | 6350 | 4.9 | 89.0 | 43795 |

[1] 0.3 phr mold release additive
[5] Synthetic Mineral Oil, Emery Industries, Cincinnati, Ohio

TABLE 3

80 WT. % BISPHENOL-A POLYCARBONATE/20 WT. % KODAR 150A

| SAMPLE | MOLD RELEASE[1] ADDITIVE | EJECTOR PIN PRESSURE (PSI) | YELLOWNESS INDEX | % TRANSMISSION | KI (6 MIN) |
|---|---|---|---|---|---|
| Control 9 | none | Would not release, parts broke | | | ↑↑↑ |
| Control 10 | Pentaerythritol tetrastearate | 4238 | 2.7 | 88.3 | KI was not measured |
| Example 6 | Emery 3002[5] (C20) | 2536 | — | Visually Clear | ↓ |
| Example 7 | Emery 3004[5] (C31) | 3058 | — | Visually Clear | ↓ |

[1] 0.3 phr mold release additive
[5] Synthetic Mineral Oil, Emery Industries, Cincinnati, Ohio The ejection pressure data shows that the hydrogenated alpha-olefin oligomer fluids of the invention exhibit mold release behavior in polycarbonate, copolyesterpolycarbonate and blends of polycarbonate with alphatic polyester resin that is considerably better than the behavior of a known effective mold release agent, pentaerythritol tetrastearate. Furthermore the release properties of the hydrogenated alpha-olefin oligomer fluids in polycarbonate (Examples 1-3) are equal to or superior to the release properties of the normal saturated alkanes of virtually equivalent molecular weight (Controls 2, 3, 4), especially when the number of carbon atoms is about 30 or greater. The data also illustrates that the mold release behavior of the hydrogenated alpha-olefin oligomer fluids is superior to that of conventional mineral oils (Controls 5 and 6). In each resin, the mold release properties exhibited by the hydrogenated alpha-olefin oligomer fluids is achieved without experiencing a loss in optical properties or melt viscosity.

What is claimed is:

1. A composition comprising an aromatic carbonate polymer in admixture with a mold release effective amount of a hydrogenated alpha-olefin oligomer fluid.

2. The composition in accordance with claim 1 wherein the aromatic carbonate polymer is a polycarbonate.

3. The composition in accordance with claim 2 wherein the polycarbonate is bisphenol-A polycarbonte.

4. The composition in accordance with claim 1 wherein the aromatic carbonate polymer is a copolyestercarbonate.

5. The composition in accordance with claim 1 wherein about 0.01 to 1.0 weight percent of the saturated poly alpha olefin fluid is present.

6. The composition in accordance with claim 5 wherein about 0.05 to 0.5 weight percent is present.

7. The composition in accordance with claim 1 wherein the saturated poly alpha olefin fluid is prepared from normal alpha-olefins having from six to twelve carbon atoms, inclusive.

8. The composition in accordance with claim 1 wherein the normal alpha-olefin is decene-1.

9. The composition in accordance with claim 1 wherein the hydrogenated alpha-olefin oligomer fluid has at least about 30 carbon atoms.

10. The composition in accordance with claim 1 wherein also present in the composition up to about 50 weight percent is a polyester devised from terephthalic acid or ester precursor or a mixture of terephthalic and isophthalic acid or precursors and trans-1,4-cyclohexane dimethanol or a mixture of trans-1,4-cyclohexane dimethanol and an alkylene diol of 2 to 10 carbon atoms, inclusive.

* * * * *